(No Model.)
M. & V. F. MAIDHOF.
CAR FENDER.
No. 522,070. Patented June 26, 1894.
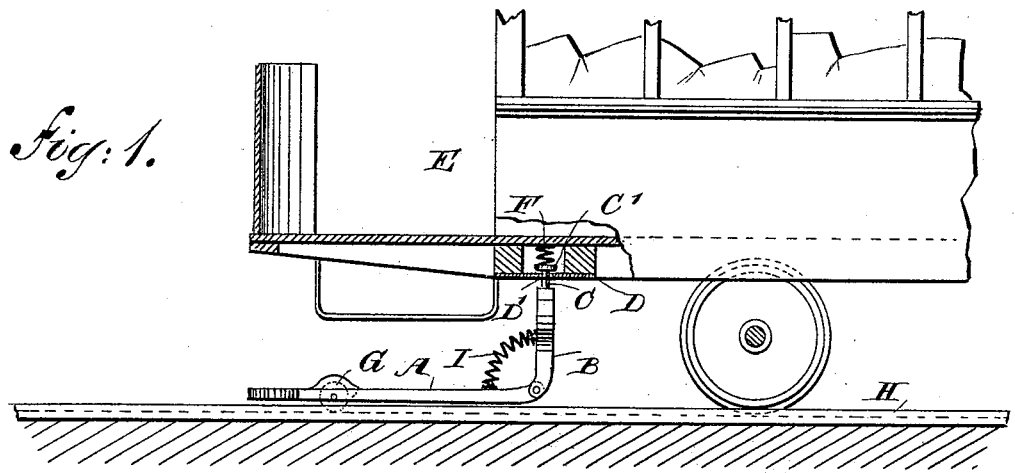
Fig: 1.
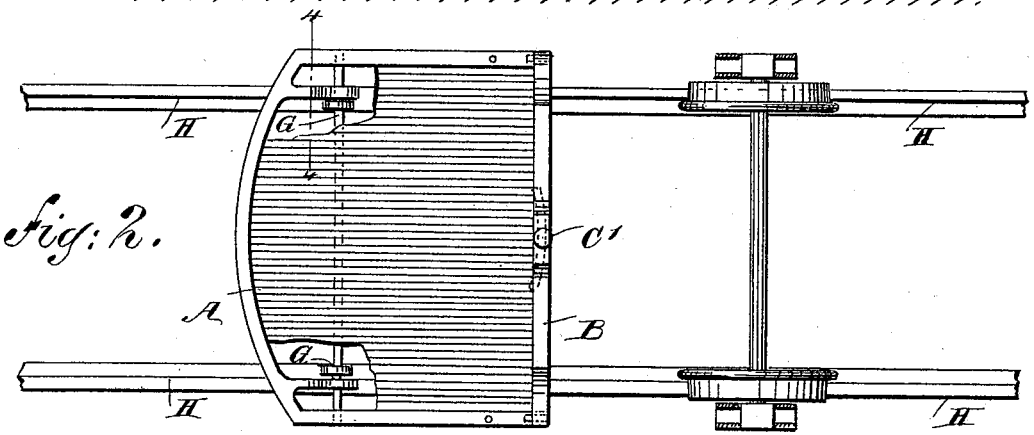
Fig: 2.
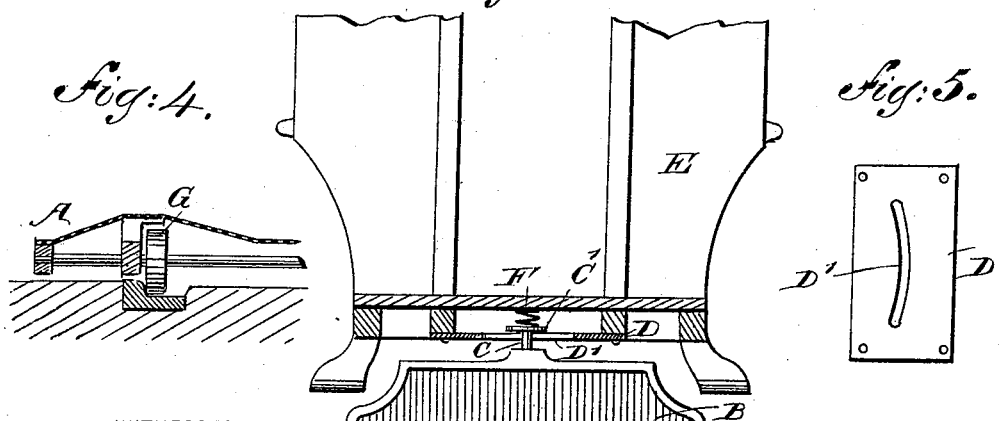
Fig: 3.
Fig: 4.  Fig: 5.
WITNESSES:
Chas. Nida
C. Sedgwick
INVENTOR
M. Maidhof
BY V. F. Maidhof
Munn & Co
ATTORNEYS.

UNITED STATES PATENT OFFICE.

MARGUERITE MAIDHOF AND VICTOR F. MAIDHOF, OF NEW YORK, N. Y.

CAR-FENDER.

SPECIFICATION forming part of Letters Patent No. 522,070, dated June 26, 1894.

Application filed January 25, 1894. Serial No. 497,954. (No model.)

*To all whom it may concern:*

Be it known that we, MARGUERITE MAIDHOF and VICTOR F. MAIDHOF, both of the city, county, and State of New York, have invented a new and Improved Car-Fender, of which the following is a full, clear, and exact description.

The object of the invention is to provide a new and improved car fender, which is comparatively simple and durable in construction, and arranged to readily pick up and carry and prevent persons from being run over by power-propelled and other cars.

The invention consists of certain parts and details, and combinations of the same, as will be hereinafter described and then pointed out in the claims.

Reference is to be had to the accompanying drawings, forming a part of this specification, in which similar letters of reference indicate corresponding parts in all the figures.

Figure 1 is a side elevation of the improvement as applied and with parts of the car in section. Fig. 2 is a plan view of the improvement with parts broken out and parts in section. Fig. 3 is a sectional front view of the improvement. Fig. 4 is an enlarged section of part of the improvement on the line 4—4 of Fig. 2; and Fig. 5 is a plan view of the pivot plate.

The improved car fender is provided with a scoop-like fender consisting principally of a platform A, and a back B, extending approximately at right angles from the horizontally disposed platform A, at the rear end of the latter, as plainly shown in Fig. 1. The platform A and back B are pivotally connected with each other, and each is made of a comparatively strong frame covered by a solid top or a suitable netting, as plainly indicated in Figs. 2, 3 and 4, the front end of the platform being preferably curved downward as much as possible to prevent injury to the person when picking him up.

On the upper edge of the back B and at or near the middle thereof is arranged a vertically-disposed pivot C, engaging a segmental or curved slot D' formed in a pivot plate D, attached to the under side of the bottom of the car E, on which the improvement is applied. The head C' of the pivot C extends above the plate D and is pressed on by a spring F, so as to permit an up and down sliding movement of the back B in case the car is subjected to jars, it being understood that the pivot C is of sufficient length to permit this up and down movement of the car or the back B. Near the front end of the platform A are journaled in suitable bearings, the rollers or wheels G, traveling on the track rails H, the said wheels being either under a separate cover or a cover formed by the said solid top or netting of the platform A; see Fig. 4.

In order to hold the wheels G always in contact with the rails H, springs I are provided, extending from the back B to the platform A, as plainly shown in Fig. 1. By this arrangement a yielding connection is established between the platform A and the back B, so that the platform is held at all times in the proper position and but a short distance above the track, with the wheels G traveling on the rails H.

The platform A is preferably of a width exceeding the distance between the track rails H, as plainly shown in Figs. 2 and 3, to prevent injury to such body parts of a person as may hang over the sides of the platform, it being understood that the said body parts are thus brought beyond the track rails H and the wheels of the car E traveling on the said rails. The sides of the back B are preferably curved as indicated in Fig. 3, to prevent the back B from striking the steps of the car E whenever the fender swings to one side on the car going around curves. Now, it will be seen that in case a person falls on the track or is struck by the front end of the car, then the platform A acts as a scoop, so that the person is picked up and is safely carried by the platform, as the latter extends close to the ground, and the party is prevented from rolling off the platform at the rear end thereof by the vertically-disposed back B.

It will be seen that the fender can readily swing, owing to the pivot C connected with the pivot plate D fixed to the car, to permit the fender to readily pass around curves in the track without danger of the wheels or rollers G running off the track rails. The slot D' permits a sidewise shifting of the pivot C in case of very sharp curves, it being understood that such movement is necessary, as the wheels G travel a considerable distance ahead of the car wheels and consequently pass onto the curve before the said car wheels reach the curve.

Having thus fully described our invention, we claim as new and desire to secure by Letters Patent—

1. In a car fender, the combination with a pivot plate attached to the car, of a fender comprising a platform, a back pivotally-connected with the said platform, a vertically-disposed pivot on the said back and engaging the said pivot plate, and wheels journaled on the front end of the said platform and adapted to travel on the track rails, substantially as shown and described.

2. In a car fender, the combination with a pivot plate attached to the car, of a fender comprising a platform, a back pivotally-connected with the said platform, a vertically-disposed pivot on the said back and engaging the said pivot plate, wheels journaled on the front end of the said platform and adapted to travel on the track rails, and a spring connection between the said back and platform, substantially as shown and described.

3. In a car fender, the combination with a pivot plate attached to the car, of a fender comprising a platform, a back pivotally-connected with the said platform, a vertically-disposed pivot on the said back and engaging the said pivot plate, wheels journaled on the front end of the said platform and adapted to travel on the track rails, and a yielding connection between the head of the pivot and the car, substantially as shown and described.

MARGUERITE MAIDHOF.
VICTOR F. MAIDHOF.

Witnesses:
 THEO. G. HOSTER,
 C. SEDGWICK.